United States Patent
Wanner et al.

(10) Patent No.: US 8,594,881 B2
(45) Date of Patent: Nov. 26, 2013

(54) METHOD FOR STRUCTURED STORAGE OF ERROR ENTRIES

(75) Inventors: Peter Wanner, Vaterstetten (DE); Alois Freistadt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1938 days.

(21) Appl. No.: 11/808,113

(22) Filed: Jun. 6, 2007

(65) Prior Publication Data

US 2008/0034260 A1 Feb. 7, 2008

Related U.S. Application Data

(63) Continuation of application No. PCT/EP2004/013884, filed on Dec. 7, 2004.

(51) Int. Cl.
  *B60R 16/023* (2006.01)
  *G05B 23/02* (2006.01)
  *G01M 17/00* (2006.01)

(52) U.S. Cl.
  USPC ........................................ 701/32.7; 701/34.3

(58) Field of Classification Search
  USPC ...................... 701/32.7, 33.4, 34.3
  See application file for complete search history.

(56) References Cited

U.S. PATENT DOCUMENTS

| | | | |
|---|---|---|---|
| 4,809,177 A | 2/1989 | Windle et al. | |
| 5,325,082 A | 6/1994 | Rodriguez | |
| 5,345,384 A * | 9/1994 | Przybyla et al. | 701/29.1 |
| 7,038,578 B2 * | 5/2006 | Will | 340/439 |
| 2004/0223461 A1 | 11/2004 | Scrandis et al. | |

FOREIGN PATENT DOCUMENTS

| | | | |
|---|---|---|---|
| DE | 4443218 A1 * | 4/1996 | |
| DE | 10121061 A1 * | 10/2002 | |
| DE | 10207222 A1 * | 10/2003 | |
| DE | 10301983 A1 * | 7/2004 | |
| EP | 631921 A2 * | 1/1995 | |
| EP | 793111 A2 * | 9/1997 | |
| JP | 2004221893 A * | 8/2004 | |
| JP | 2004302944 A * | 10/2004 | |
| WO | WO 03/013065 A1 | 2/2003 | |

OTHER PUBLICATIONS

EPO machine translation of DE 10301983 (original DE document published Jul. 29, 2004).*
JPO machine translation of JP 2004-302944 (original JP document published Oct. 28, 2004).*
EPO machine translation or EP 631921 (original EP document published Jan. 4, 1995).*
International Search Report dated Aug. 24, 2005 (Six (6) Pages).

* cited by examiner

*Primary Examiner* — James Trammell
*Assistant Examiner* — David Testardi
(74) *Attorney, Agent, or Firm* — Crowell & Moring LLP

(57) ABSTRACT

In a method for structured storage of error entries of the users of a data bus in a motor vehicle, upon occurrence of an error, a function possibly influenced by the error and the members of an associated function-specific group of diagnostic-relevant users is determined, an error entry is prepared at a first member of the function-specific group, and a diagnostic pointer referring to the first member is stored at a second member of the function-specific group.

18 Claims, 2 Drawing Sheets

METHOD FOR STRUCTURED STORAGE OF ERROR ENTRIES

CROSS REFERENCE TO RELATED APPLICATIONS

This application is a continuation of PCT International Application No. PCT/EP2004/013884, filed Dec. 7, 2004, the entire disclosure of which is herein expressly incorporated by reference. This application is related to application Ser. No. 11/808,114 (U.S. Pat. No. 8,452,485) entitled "Method for Preparing Error Entries", filed on even date herewith.

BACKGROUND AND SUMMARY OF THE INVENTION

The present invention relates to a method for structured storage of error entries of the users of a data bus in a motor vehicle.

Typical users of a data bus, in particular control units in a motor vehicle, have the capability of detecting errors of their own operation and/or errors of the output behavior, e.g., the transmission behavior, of other users of the data bus.

Typically, when an error is detected of a user of a data bus, the user detecting the error, possibly after checking additional criteria, instigates an error entry in an error memory.

An error occurring in one of the users is frequently first apparent due to a warning display of the vehicle or because the driver notices that a function of the vehicle, such as a function for automatic adaptive cruise control, is impaired. The driver of the vehicle typically goes to a service station in both cases. At the service station an error search is performed where error entries from error memories of the control units present in the motor vehicle are read out via a diagnostic system. Appropriate service, repair, or replacement measures are then performed as a function of the output error entries.

Modern motor vehicles typically contain several dozen control units. Reading out the error memory of each individual one of these control units and analyzing the large quantity of resulting diagnostic data would be extremely work-intensive and time-consuming. Therefore, the error search typically begins with a user which, according to external signs, provided documentation, and/or the professional knowledge of the service personnel, participates in the function. This requires providing continuously updated documentation and/or the capability of the service personnel to perform an assignment between a broken-down or impaired function of a motor vehicle and one or more control units installed in the motor vehicle. Because of the complicated information-technology cross-linking of the users of a data bus in modern motor vehicles, changing vehicle configurations, and the manifold different vehicle types and product lines, this assignment by the service personnel may not always be provided error-free. The result may be a long-lasting and/or unsuccessful error search.

As an alternative to the distributed storage of error entries in multiple control units, performing error entries in a central error memory is known. The central and complete storage of the errors of a distributed system in a single user requires high structuring effort, and is disadvantageous due to the large quantity of data that is to be administered in the central error memory and analyzed during the error search.

Performing an entry at each of the various users participating in the function impaired by the error for one and the same error is a further alternative. Thus, the probability of finding a matching error input during the error search is increased for the service personnel. However, this procedure requires precise knowledge by the service personnel about which users participate in the particular function. In addition, the total amount of data to be administered in the system is drastically increased by the redundant storage. This not only causes an unnecessarily high memory space demand, but also makes a possible central analysis of the error entries of multiple users more difficult.

Exemplary embodiments of the present invention provide a simple method for structured storage of error entries of the users of a data bus in a motor vehicle, by which error entries are reliably findable in case of error.

Exemplary embodiments of the present invention provide a method in which, upon the occurrence of an error, a function possibly influenced by the error and the members of an associated function-specific group of diagnostic-relevant users are determined, an error entry is prepared at a first member of the function-specific group and a diagnostic pointer referring to the first member is stored for a second member of the function-specific group.

One advantage of a method according to the present invention is that an error entry must only actually be performed for one, e.g., in the above case the first, or few members of the group, but an error entry of at least one other, e.g., in the above case the second, member of the same function-specific group, may be found easily and reliably via corresponding diagnostic pointers.

Preparing a diagnostic pointer instead of a complete error entry for the second member results in very low memory space demand. Reducing the total number of actual error entries in relation to a redundant error storage simplifies a possible central analysis of the error entries of multiple users and/or members.

A method according to the present invention differs from the concept of a single central error memory for the entire vehicle in that, among other things, at least one error memory is defined for each vehicle function. The error memory of a user may be responsible for multiple functions. Because of the high degree of specialization of most control units, however, only a fraction of all vehicle functions are not applicable to each user having error memory. The analysis of such an error memory is therefore much less complex than that of a single central error memory.

The method according to the present invention includes the assignment of the users to function-specific groups, i.e., groups related to functions of the vehicle. A user may be assigned to multiple function-specific groups. The assignment as a member to a function-specific group may be performed by the producer or later by one or more corresponding memory entries.

The assignment may be performed absolutely and/or relatively. In an absolute assignment, all members of a group are known to at least one member of the group in at least one operating state, for example, by their ID. In case of an error, error messages may be distributed from such a member to all remaining members of the group. In a relative assignment, only individual members of a group are known to all or only the particular relevant members of the group, i.e., the particular hierarchically higher-order and/or lower-order members. The users are less assigned in this case to the group itself than rather to the known group members. The entire group results from a linkage of the individual assignments.

According to exemplary embodiments of the present invention, the members of the function-specific group are determined either absolutely in one work step or relatively step-by-step. For relative determination, a member also does not necessarily have to become known to all members in the course of the determination. In accordance with one aspect of the present invention, it suffices to incorporate the members of the function-specific group step-by-step in a method according to the present invention.

A function-specific group is composed according to the present invention of all users considered as diagnostic-relevant. Diagnostic-relevant users are to be understood primarily as all users which participate in a function impaired by the error.

According to an exemplary embodiment of the present invention, however, at least one such user is diagnostic-relevant and assigned as a member to the particular function-specific group which does not participate in the function on which the function-specific group is based in the current configuration of the motor vehicle. This may be advantageous in particular if such a user participated in the same or a similar function in an earlier configuration of the motor vehicle or participated in the same or a similar function in another motor vehicle type. In principle, the assignment to the function-specific group may be performed based on whether service personnel would consider it theoretically advisable, from their experience with earlier vehicle configurations, for example, to incorporate a user in the error search.

According to an exemplary embodiment of the present invention, possibly after checking additional conditions, an error entry is prepared for a member at which an error is detected. Alternatively, an error entry may also be performed at another member of the same function-specific group, possibly after checking additional conditions, e.g., at the hierarchically next-higher or highest-order user. This embodiment is particularly suitable for a combination with a method described in U.S. patent application Ser. No. 11/808,114(U.S. Pat. No. 8,452,485) entitled "Method for Preparing Error Entries", filed on even date herewith, the entire disclosure of which is herein expressly incorporated by reference. Error entries are even conceivable at users who are not a member of the particular function-specific group.

Users at which a diagnostic pointer is to be prepared are requested to prepare it in case of error by an error message according to the present invention. According to an exemplary embodiment of the present invention, for this purpose, an error message is output to a second member by a first member of a function-specific group for which an error entry has been prepared and a diagnostic pointer toward the error message of the first member is prepared at the second member. The diagnostic pointer at the second member is thus not permanently present independently of an error, but rather may be evaluated during an error search as an indicator of an actual error entry at one of the members. The diagnostic pointer contains at least the data which is necessary to refer to another member, in the simplest case to a member having an error entry. If necessary, the diagnostic pointer may be enhanced with further data helpful in the error search or suitable for rapid information feedback. This data may be previously transferred entirely or partially via error messages to the member at which the diagnostic pointer was prepared, and/or calculated by information processing occurring at the particular member, possibly incorporating local data.

Diagnostic pointers may refer to a user having an error entry either directly or linked to one another. Thus, if there is an error entry at a first member of a function-specific group, to which the diagnostic pointer of a second member refers, a reference of a third member to the first member may be implemented by preparing a diagnostic pointer to the first member at the third member and/or by preparing a diagnostic pointer referring to the second member at the third member, which may be cascaded with the diagnostic pointer of the second member.

Such a cascaded linkage of diagnostic pointers, described in two stages here, may also be prepared in three or more stages in an analogous procedure. In particular, the cascaded reference of the diagnostic pointer to one or more users having error memories, here to the first member of the group, may occur according to a hierarchy of the users established by the producer or related to the function of the users or related to the data bus connection of the users.

Like the reference of the diagnostic pointers, the output of error messages in the preparation of the diagnostic pointers may be cascaded in the reverse direction. In the example described above, an error message is output to the third member by the second member after receiving the error message of the first member and the diagnostic pointer of the third member is prepared upon the error message of the second member for this purpose.

According to an exemplary embodiment of a method according to the present invention, in all members of a function-specific group, either an error entry or a possibly cascaded diagnostic pointer referring to a member having error entry is prepared. Finding an error entry starting from an arbitrary user assigned to a function-specific group is thus ensured.

However, for this purpose, it is to be ensured that all users assigned to a function-specific group are reached during the distribution of error messages. This is ensured according to the present invention by memory entries of the user which are used for the assignment to a function-specific group, and/or contents of the error messages which contain information for further distribution of error messages.

The distribution of error messages may be performed largely independently of the actual error storage. It must only be ensured that the users which receive an error message know to which users a diagnostic pointer to be prepared is to refer. For example, the distribution of error messages may begin at a user detecting an error or at a user at which an error entry is performed. Alternatively, a user from which the error messages are later to be distributed may first be informed about the storage location of an error message or decide itself about the storage location.

The linkage of the members of a group achieved according to the present invention may be implemented in such a way that a single error entry is performed and multiple diagnostic pointers are prepared for a detected error. Alternatively, for example, to reduce the linkage depth to a single error, an error entry may be performed at more than one user. The diagnostic pointers of the other users assigned to the group then refer directly or cascaded to one of the error entries.

According to the present invention, a function possibly influenced by the error is determined upon the occurrence of an error. In many cases, a single possibly influenced function may be determined uniquely on the basis of the identity of the detected user or the knowledge of the error source. If a unique determination is not possible and/or multiple functions may be influenced, a method according to the present invention is applied according to a refinement of the present invention to the function-specific groups of diagnostic-relevant users of all possibly influenced functions. If necessary, redundancies may be avoided by defining the unifying quantity of the individual function-specific groups as new for the particular combination of function-specific groups of diagnostic-relevant users.

Other objects, advantages and novel features of the present invention will become apparent from the following detailed description of the invention when considered in conjunction with the accompanying drawings.

DETAILED DESCRIPTION OF THE DRAWINGS

Figure 1:
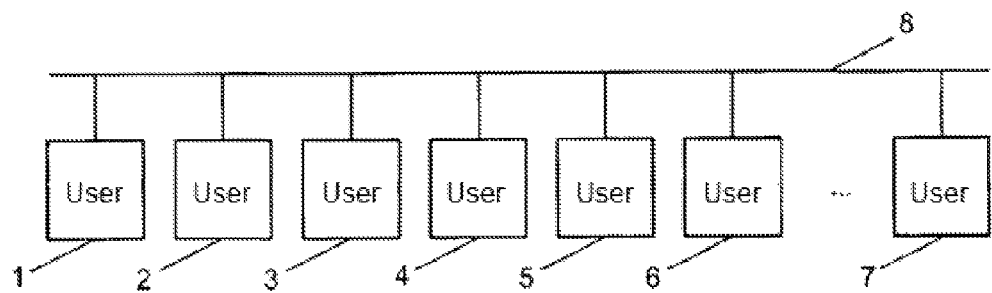
FIG. 1 schematically shows a data bus having multiple users in a motor vehicle.

A data bus 8 having multiple users 1, 2, 3, 4, 5, 6, 7 in a motor vehicle is schematically illustrated in FIG. 1.

Among other things, the following users contribute to a function of a motor vehicle, such as an automatic adaptive cruise control:

Users 4, 5, and 6 contribute to the function on a lower hierarchical level, e.g., as sensors.

User 2, e.g., a control unit for executing low level regulatory tasks, is hierarchically higher-order than users 4 and 5 in regard to the function.

User 3, e.g., also a control unit for executing low-level regulatory tasks, is hierarchically higher-order than user 6 in regard to the function.

User 1, e.g., a control unit for executing high-level regulatory tasks, is hierarchically higher-order than users 2 and 3 in regard to the function.

Users 1, 2, 3, 4, 5, and 6 are assigned to a group of users specific for the automatic adaptive cruise control in accordance with their functional linkage. User 7 is also assigned to this group, which does not participate in the relevant function in the current vehicle configuration, but it participated in a similar function in an earlier vehicle configuration. User 7 is therefore assigned to the function-specific group, because service personnel trusted with the earlier vehicle configuration would also incorporate user 7 in certain circumstances into an error search related to the function "automatic adaptive cruise control."

In both of the embodiments of the present invention described in the following, it is assumed that an error 9 is detected by user 2.

Figure 2:
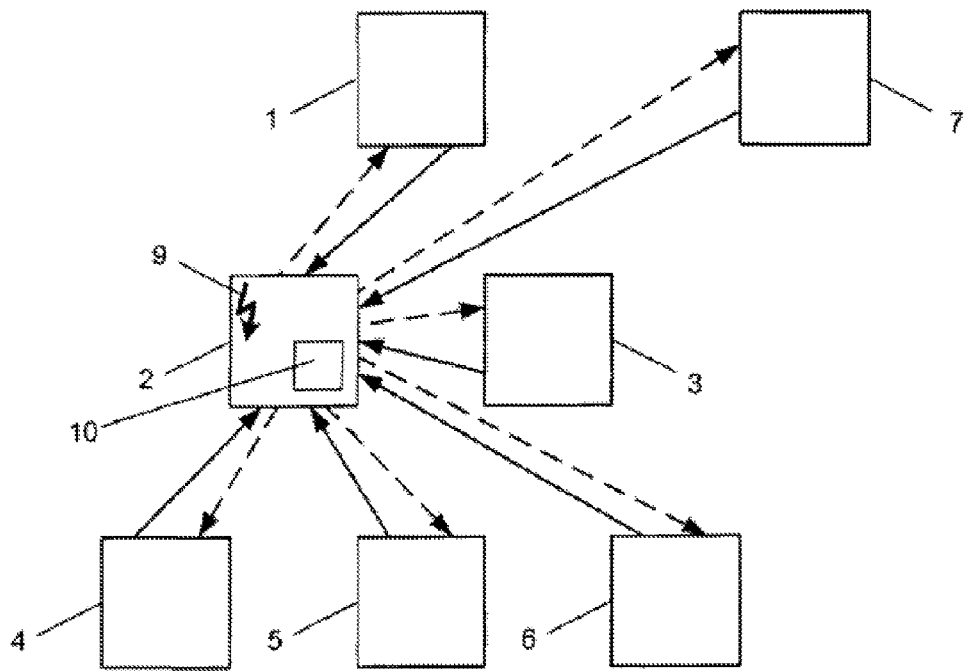
FIG. 2 shows the information flow between the users according to a first embodiment of a method according to the present invention for structured storage of error entries.

FIG. 2 illustrates the information flow between the users according to a first embodiment of a method according to the present invention for structured storage of error entries. According to this first embodiment, user 2 has its own error memory 10 and stores the detected error 9 there automatically as an error entry. Because of memory entries performed by the producer, it is known at user 2 that an error of the established type influences the function "automatic adaptive cruise control" in a safety-critical way under certain circumstances. The determination according to the present invention of the function of "automatic adaptive cruise control," which is possibly influenced by the error, is performed on the basis of this memory entry. In addition, the addresses of all members of the function-specific group belonging to the function "automatic adaptive cruise control" are absolutely stored at user 2. The members of the associated function-specific group are therefore completely determined at user 2 on the basis of these entries.

The user 2 then transmits error messages to all remaining members of the function-specific group, i.e., to users 1, 3, 4, 5, 6, and 7. In FIG. 2, dashed arrows identify the transmitted error messages.

Upon receiving the particular error message, a diagnostic pointer pointing directly to user 2 is prepared at each of the remaining members of the group, i.e., at users 1, 3, 4, 5, 6, and 7. The diagnostic pointers are illustrated as solid arrows in FIG. 2.

In case of a later error search, a corresponding error entry is present upon readout of the error memory 10 of user 2. Upon readout or the attempt to read out an error memory of users 1, 3, 4, 5, 6, and 7, i.e., all remaining members of the function-specific group based on the function "automatic adaptive cruise control," a diagnostic pointer refers to user 2. Finding out the error entry at user 2 rapidly and simply is thus ensured independently of the starting point of the error search.

Figure 3:
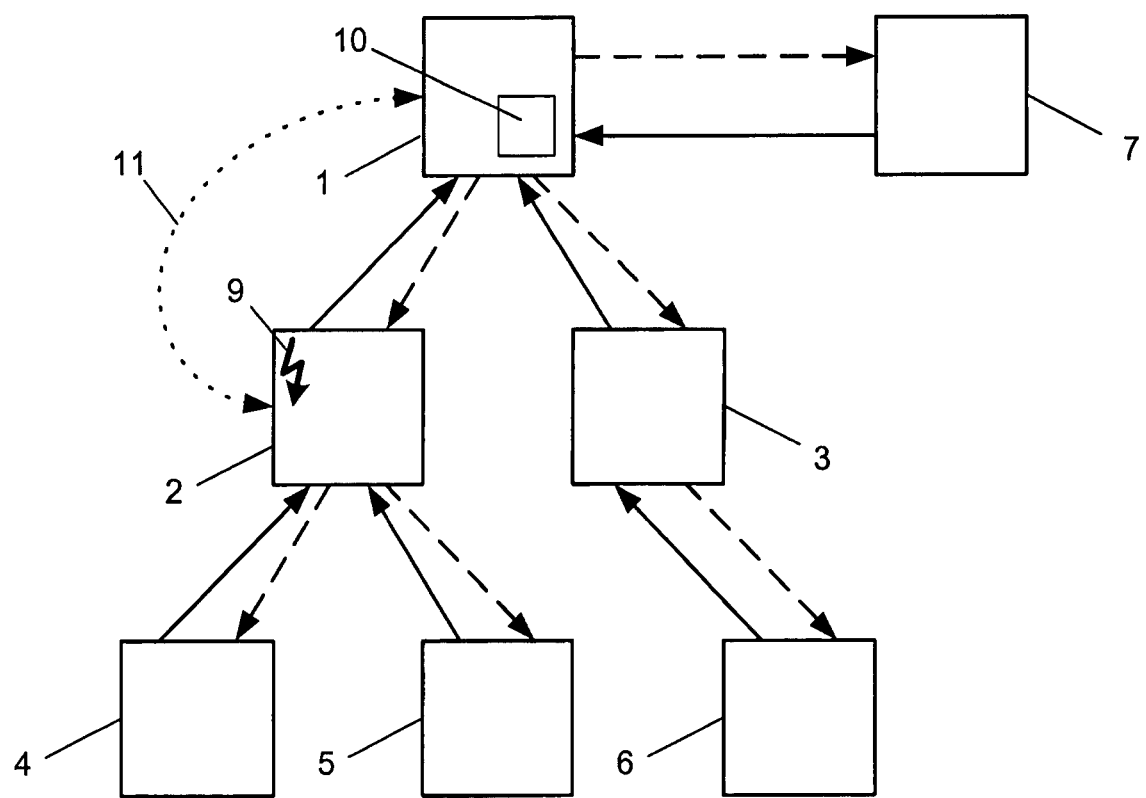
FIG. 3 shows the information flow between the users according to a second embodiment of a method according to the present invention for structured storage of error entries.

FIG. 3 illustrates the information flow between the users according to a second embodiment of a method according to the present invention for structured storage of error entries. An error 9 again first occurs at user 2. An associated error entry is not performed locally at user 2, in contrast to the first embodiment, but rather an error entry 10 is performed at another user, in this case the hierarchically higher-order user 1. The dialogue in this regard between users 1 and 2 is identified by the dotted double arrow 11 in FIG. 3. If necessary, performing the error entry 10 is linked to additional conditions. Depending on the type of the dialogue 11, individual messages of the communication described in the following may be anticipated by the dialogue 11 and may be dispensed with during the later distribution of error messages.

Because of memory entries performed by the producer and/or an error description of user 2 and/or the knowledge of user 2 as an error source, it is detected at user 1 that an error of the established type influences the function "automatic adaptive cruise control" in a safety-critical way in certain circumstances. On the basis of this knowledge, the determination according to the present invention of the function of "automatic adaptive cruise control," which is possibly influenced by the error, is performed.

In addition, the addresses of the members situated on the next-lower hierarchical level of the function-specific group belonging to the function "automatic adaptive cruise control" and the addresses of the nonparticipating members are stored at user 1. In this case, these are users 2 and 3 situated on the next-lower hierarchical level and the nonparticipating user 7. The members of the function-specific group are thus determined on the basis of these entries only partially at user 1.

User 1 transmits error messages to the members known thereby of the function-specific group, i.e., to users 2, 3, and 7. These then each prepare a diagnostic pointer directed to user 1. The dashed arrows in FIG. 3 also identify the transmitted error messages, diagnostic pointers are shown as solid arrows.

Error messages are distributed cascaded to the remaining members of the function-specific group. At users 2 and 3, the addresses of the members subordinate to the individual users on the next-lower hierarchical level of the function-specific group belonging to the function "automatic adaptive cruise control" are stored. For user 2, these are users 4 and 5, for user 3, this is user 6.

User 2 transmits error messages to users 4 and 5. These then prepare diagnostic pointers directed to user 2. User 3 transmits an error message to user 6. This user then prepares a diagnostic pointer directed to user 3. The diagnostic pointer of users 4, 5, and 6 may be cascaded with the diagnostic pointers of the particular higher-order users 2 and 3 and thus refer indirectly to user 1.

During a later error search, a corresponding error entry is present upon readout of the error memory 10 of user 1. Upon readout or the attempt to read out an error memory of users 2, 3, 4, 5, 6, or 7, i.e., all remaining members of the function-specific group, reference is made to user 1 by one or more cascaded diagnostic pointers. Rapidly and simply finding the error entry at user 1 is thus ensured independently of the starting point of the error search.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for structured storage of error entries of the users of a data bus in a motor vehicle, the method comprising the acts of:
   determining, upon occurrence of an error, a function possibly influenced by the error and users that are members of a function-specific group of diagnostic-relevant users;
   preparing, by a first user that is a first member of the function-specific group, an error entry; and
   upon receiving message of the error, storing, by a second user that is a second member of the function-specific group and by a third user that is a third member of the function-specific group, a diagnostic pointer referring to the first user that is the first member,
   wherein the users are one of sensors for the function and control units for controlling the function, and
   wherein the diagnostic pointer uses less memory space than the error entry.

2. The method according to claim 1, further comprising the acts of:
   outputting an error message by the first to the second and third users; and
   preparing the diagnostic pointer at the second and third users upon receipt of the error message of the first member.

3. The method according to claim 2, further comprising the act of:
   assigning a user, which does not currently participate in the function of the function-specific group in the current configuration of the motor vehicle, as a member of the function-specific group.

4. The method according to claim 3, wherein the user which is assigned as a member of a function-specific group and does not participate in the function in the current configuration of the motor vehicle participated or participates in the same or a similar function in an earlier configuration of the motor vehicle or in another motor vehicle type.

5. The method according to claim 1, further comprising the act of:
   preparing either an error entry or a diagnostic pointer referring to a member having error entry by all users that are members of the function-specific group.

6. The method according to claim 5, further comprising the act of:
   assigning a user, which does not currently participate in the function of the function-specific group in the current configuration of the motor vehicle, as a member of the function-specific group.

7. The method according to claim 6, wherein the user which is assigned as a member of a function-specific group and does not participate in the function in the current configuration of the motor vehicle participated or participates in the same or a similar function in an earlier configuration of the motor vehicle or in another motor vehicle type.

8. The method according to claim 1, further comprising the act of:
   assigning a user, which does not currently participate in the function of the function-specific group in the current configuration of the motor vehicle, as a member of the function-specific group.

9. The method according to claim 8, wherein the user which is assigned as a member of a function-specific group and does not participate in the function in the current configuration of the motor vehicle participated or participates in the same or a similar function in an earlier configuration of the motor vehicle or in another motor vehicle type.

10. A method for structured storage of error entries of the users of a data bus in a motor vehicle, the method comprising the acts of:
    determining, upon occurrence of an error, a function possibly influenced by the error and users that are members of a function-specific group of diagnostic-relevant users;
    preparing, by a first user that is a first member of the function-specific group, an error entry;
    storing, by a second user that is a second member of the function-specific group a diagnostic pointer referring to the first user that is the first member;
    preparing, by a third user that is a third member of the function-specific group, a diagnostic pointer referring to the second user that is the second member of the function-specific group;
    wherein the users are one of sensors for the function and control units for controlling the function, and
    wherein the diagnostic pointer stored by the second user and the diagnostic pointer prepared by the third user are for the error entry prepared by the first user.

11. The method according to claim 10, further comprising the acts of:
    outputting an error message by the second user to the third user; and
    preparing the diagnostic pointer of the third member based on the error message of the second member.

12. The method according to claim 11, further comprising the act of:
    assigning a user, which does not currently participate in the function of the function-specific group in the current configuration of the motor vehicle, as a member of a the function-specific group.

13. The method according to claim 12, wherein the user which is assigned as a member of a function-specific group and does not participate in the function in the current configuration of the motor vehicle participated or participates in the same or a similar function in an earlier configuration of the motor vehicle or in another motor vehicle type.

14. The method according to claim 10, further comprising the act of:
    assigning a user, which does not currently participate in the function of the function-specific group in the current configuration of the motor vehicle, as a member of the function-specific group.

15. The method according to claim 14, wherein the user which is assigned as a member of a function-specific group and does not participate in the function in the current configuration of the motor vehicle participated or participates in the same or a similar function in an earlier configuration of the motor vehicle or in another motor vehicle type.

16. The method of claim 10, wherein the diagnostic pointers each use less memory space than the error entry.

17. The method of claim 10, wherein all users that are members of the function-specific group except for the first user store the diagnostic pointer for the error entry prepared by the first user.

18. The method of claim 17, wherein the all users that are members of the function-specific group are configured in a hierarchical arrangement and the diagnostic pointers stored by the all users that are members of the function-specific group except for the first user refer to a user that is arranged at a next highest level in the hierarchical arrangement.

* * * * *